(12) United States Patent
Wang

(10) Patent No.: US 8,696,057 B2
(45) Date of Patent: Apr. 15, 2014

(54) CANTILEVER BRACKET MOUNTED ON A SEAT

(76) Inventor: Teng Wang, Shulin (TW)

(*) Notice: Subject to any disclaimer, the term of this patent is extended or adjusted under 35 U.S.C. 154(b) by 540 days.

(21) Appl. No.: 12/929,177

(22) Filed: Jan. 6, 2011

(65) Prior Publication Data

US 2012/0080914 A1 Apr. 5, 2012

(30) Foreign Application Priority Data

Oct. 4, 2010 (TW) ................................ 99219134 U

(51) Int. Cl.
*A47C 7/62* (2006.01)
(52) U.S. Cl.
USPC .................................. 297/188.06; 297/188.03
(58) Field of Classification Search
USPC .................. 297/397, 188.03, 188.04, 188.05, 297/188.06; 403/72, 73, 146, 161
See application file for complete search history.

(56) References Cited

U.S. PATENT DOCUMENTS

| | | | | |
|---|---|---|---|---|
| 797,692 | A * | 8/1905 | Kirchner | 403/73 |
| 1,207,332 | A * | 12/1916 | Selman | 108/28 |
| 2,535,112 | A * | 12/1950 | Woody | 312/233 |
| 2,584,179 | A * | 2/1952 | Adams | 211/105 |
| 3,407,825 | A * | 10/1968 | Doyle | 135/98 |
| 5,092,549 | A * | 3/1992 | Beech | 248/103 |
| 5,094,418 | A * | 3/1992 | McBarnes et al. | 248/286.1 |
| 5,791,614 | A * | 8/1998 | Sims | 248/230.7 |
| 6,095,611 | A * | 8/2000 | Bar et al. | 297/440.21 |
| 6,260,750 | B1 * | 7/2001 | Chiang | 224/275 |
| 6,390,426 | B1 * | 5/2002 | Berry | 248/230.1 |
| 6,629,727 | B2 * | 10/2003 | Asbach et al. | 297/188.21 |
| 6,651,941 | B1 * | 11/2003 | Kinsel | 248/100 |
| 6,789,557 | B1 * | 9/2004 | Wahl, Jr. | 135/154 |
| 7,243,892 | B2 * | 7/2007 | Pfister | 248/371 |
| 2002/0013966 | A1 * | 2/2002 | Heimbrock et al. | 5/600 |
| 2003/0038514 | A1 * | 2/2003 | Johnston | 297/188.04 |
| 2004/0108437 | A1 * | 6/2004 | Schuurmans | 248/478 |
| 2006/0243764 | A1 * | 11/2006 | Chiang | 223/85 |
| 2007/0090251 | A1 * | 4/2007 | Padden | 248/303 |

* cited by examiner

*Primary Examiner* — David E Allred
(74) *Attorney, Agent, or Firm* — Bacon & Thomas, PLLC

(57) ABSTRACT

A cantilever bracket mounted on two headrest supporting rods of a seat and includes two cantilevers and a post. The cantilever has one end provided with a fixing seat having a through channel through which the corresponding rod can pass, and the other end provided with a pivot seat. The post having one end provided with a supporting portion for supporting or hanging an object, and the other end provided with a first pivot which passes through pivot holes of the two pivot seats and pivotally connects the two cantilevers as a single unit of which the distance between the two fixing seats is adjustable. The cantilever bracket is applicable to seats of various headrest supporting rods with different spacings therebetween and eliminate the need for brackets of different specifications in accordance with the various headrest supporting rod spacings.

1 Claim, 4 Drawing Sheets

CANTILEVER BRACKET MOUNTED ON A SEAT

FIELD OF THE INVENTION

The present invention relates to a cantilever bracket mounted on two headrest supporting rods of a seat, which includes two cantilevers each having one end provided with a fixing seat having a through channel through which the corresponding rod can pass and the other end provided with a pivot seat, and a post having one end provided with a supporting portion for supporting or hanging an object and the other end provided with a first pivot which passes through pivot holes of the two pivot seats and thereby pivotally connects the two cantilevers as a single unit. As such, the cantilever bracket is applicable to seats of various headrest supporting rods with different spacings therebetween and can eliminate the need to manufacture brackets of different specifications in accordance with the various headrest supporting rod spacings, as is otherwise required in the case of the conventional bracket, the distance between whose two fixing seats is not adjustable.

BACKGROUND OF THE INVENTION

With the rapid growth of economy and the steady development of the automobile industry, cars are now extensively used for long-distance travel as well as short-distance transportation. As people's dependence on cars increases, drivers and passengers spend more and more time in cars and become demanding of the comfort and convenience of use of the limited car interior space. In order to provide backseat passengers with a comfortable and refreshing riding experience, it is a trend to mount brackets on the front seats and install an audio/video playing device on each bracket such that the audio/video playing devices are positioned on the backs of the front seats by means of the brackets respectively. Thus, backseat passengers can watch films or listen to music while riding in cars.

Please refer to FIG. 1 for a conventional bracket 10 to be mounted on a seat 13, wherein the bracket 10 is composed essentially of a first plate 11 and two second plates 12. The two ends of the first plate 11 correspond in position to the two headrest supporting rods 131 of the seat 13 and are curved to form first curved portions 111 respectively. Each first curved portion 111 is configured to receive a portion of the corresponding rod 131. In addition, one side of the first plate 11 is centrally provided with an outwardly extending curved post 112. Each second plate 12 has one end curved into a second curved portion 121 for receiving a portion of the corresponding rod 131. The other end of each second plate 12 is formed with a threaded hole 122 through which a screw 15 can pass. To assemble the conventional bracket 10, the first curved portions 111 at both ends of the first plate 11 are brought into contact with one side of the rods 131, and the second curved portion 121 at one end of each second plate 12 is brought in contact with the other side of the corresponding rod 131. Then, two screws 15 are inserted through the threaded holes 122 respectively and fastened to the first plate 11, thereby fastening the two second plates 12 and the first plate 11 together as a single unit. Consequently, the two rods 131 of the seat 13 are clamped by the corresponding first and second curved portions 111, 121 respectively, and the conventional bracket 10 is stably formed on the two rods 131 by the first plate 11 and the two second plates 12. The exposed end of the curved post 112 in the conventional bracket 10 can be engaged in a hole 141 of an audio/video playing device 14 so that the audio/video playing device 14 is secured to the back of the seat 13 via the conventional bracket 10, allowing a backseat passenger to watch films or listen to music via the audio/video playing device 14.

While the conventional bracket 10 described above is widely used due to its simple structure, it has the following drawbacks in use.

First of all, in the conventional bracket 10, the distance between the first curved portions 111 at the two ends of the first plate 11 is fixed and not adjustable. In addition, the second curved portions 121 of the second plates 12 must correspond in position to the first curved portions 111 in order to clamp the rods 131 in conjunction with the corresponding first curved portions 111; hence, the positions of the second curved portions 121 are not adjustable, either. While the positions of the first and second curved portions 111, 121 of the conventional bracket 10 are invariable and cannot be adjusted, the distance between the headrest supporting rods 131 of the seat 13 varies with the model and size of cars. Therefore, manufacturers of the conventional bracket 10 must set up different production lines for producing brackets 10 of different specifications, so as to cope with the various spacings between the headrest supporting rods 131 of seats 13 in different models of cars. As a result, not only is the convenience of use of the conventional bracket 10 substantially restricted, but also the production of brackets 10 of different sizes increases manufacturers' labor and material costs. Moreover, brackets 10 of different specifications incur high storage and transportation costs as well as high production costs.

Secondly, as the positions of the first and second curved portions 111, 121 of the conventional bracket 10 are fixed and not adjustable, once the audio/video playing device 14 is fastened to the conventional bracket 10 and thereby secured on the back of the seat 13, the position of the audio/video playing device 14 is also fixed and cannot be adjusted. Hence, when the position of the seat 13 is adjusted along the forward/backward direction, or when the inclination angle of the seat 13 is changed, the audio/video playing device 14 on the back of the seat 13 is moved or tilted at the same time and leaves the original position. The audio/video playing device 14 may end up too far away from the backseat passenger, or the forward/backward tilt angle or left/right viewing angle of the audio/video playing device 14 may go beyond the passenger's acceptable range, thus making it difficult for the backseat passenger to view the images played by the audio/video playing device 14.

According to the above, the production, storage, and transportation costs of the conventional bracket tend to be high, and the invariable positions of the curved portions of the conventional bracket may hinder the use of the audio/video playing device or other devices installed on the conventional bracket. Therefore, the issue to be addressed by the present invention is to design and make a cantilever bracket to be mounted on a seat, wherein the cantilever bracket includes two cantilevers pivotally connected by a post so that the two cantilevers can be rotated about a rotation axis defined by the post, with a view to adjusting the distance between the fixing seats on the two cantilevers and allowing the fixing seat on each cantilever to be precisely aligned with and mounted around the corresponding headrest supporting rod of the seat. It is intended that the cantilever bracket is applicable to seats with various spacings between the headrest supporting rods and that the position and angle of a device supported by the cantilever bracket can be adjusted simply by rotating the post of the cantilever bracket.

BRIEF SUMMARY OF THE INVENTION

In view of the aforementioned drawbacks of the conventional bracket to be mounted on a seat—namely high production, storage, and transportation costs and a fixed configuration that cannot be adjusted, the inventor of the present invention made great effort in research and experiment and finally succeeded in developing a cantilever bracket to be mounted on a seat. It is hoped that the present invention can solve the foregoing problems effectively.

It is an object of the present invention to provide a cantilever bracket to be mounted on a seat, wherein the cantilever bracket, to be secured to two headrest supporting rods of the seat, includes two cantilevers and a post. Each cantilever has one end provided with a fixing seat, and each fixing seat is formed with a through channel through which the corresponding rod can pass. Each fixing seat has an inner wall surface concavely provided with a receiving cavity. The receiving cavities correspond in position to the through channels respectively and are each configured to receive a buffer block. Each fixing seat further has an outer wall surface formed with a through hole. The through holes correspond in position to and communicate with the receiving cavities respectively. One end of a first threaded fastener passes through the through hole of the corresponding fixing seat, is threadedly fastened to the buffer block in the corresponding receiving cavity, and is pressed tightly against the corresponding rod either directly or indirectly, such that each cantilever is fixed in position to the corresponding rod. The other end of each cantilever is provided with a first pivot seat, and each first pivot seat is penetrated by a pivot hole through which the post can pass. One end of the post is curved to form a supporting portion for supporting or hanging an object; the other end of the post is provided with a first pivot which passes through the pivot holes of the two first pivot seats and thereby pivotally connects the two cantilevers as a single unit. The cantilever bracket further includes an elastic pad peripherally pressed against the bottom of the first pivot seat of one of the cantilevers at a position adjacent to the pivot hole of that cantilever. The elastic pad is centrally provided with an aperture. One end of a second threaded fastener passes through the aperture and is fastened threadedly to the first pivot. Thus, the periphery of the elastic pad is pressed tightly against the bottom of the corresponding first pivot seat, while the elastic pad, the two cantilevers, and the post are pivotally and tightly connected as a whole. As the cantilever bracket of the present invention is composed mainly of two cantilevers, a user can rotate the two cantilevers about a rotation axis defined by the post in order to adjust the distance between the fixing seats of the two cantilevers, thereby allowing the fixing seat of each cantilever to be precisely aligned with and mounted around the corresponding rod. As such, the cantilever bracket of the present invention is applicable to seats of various headrest supporting rod spacings and can eliminate the need to manufacture brackets of different specifications in accordance with the various headrest supporting rod spacings of seats, as is otherwise required in the case of the conventional bracket, the distance between whose two fixing seats is not adjustable. The cantilever bracket of the present invention provides increased convenience of use and helps cut the storage and transportation costs associated with the manufacture of brackets of different specifications.

It is another object of the present invention to provide the foregoing cantilever bracket, wherein each cantilever consists of a first cantilever portion and a second cantilever portion. Each first cantilever portion has one end fixedly provided with the fixing seat and the other end provided with a receiving space and an opening, wherein the opening communicates with the receiving space. Each second cantilever portion has one end which is received and can move back and forth in the receiving space of the corresponding first cantilever portion. Each second cantilever portion has an opposite end extending out of the receiving space of the corresponding first cantilever portion through the opening of the corresponding first cantilever portion and forms the first pivot seat. Thus, by adjusting the length of each second cantilever portion that is received in the receiving space of the corresponding first cantilever portion, the length of each cantilever can be changed to move the post to an appropriate position closer to or farther away from the seat.

Still another object of the present invention is to provide the foregoing cantilever bracket, wherein each cantilever consists of a first cantilever portion and a second cantilever portion. Each first cantilever portion has a first end provided with the fixing seat and an opposite second end provided with a second pivot seat. Each second cantilever portion has a first end provided with a third pivot seat pivotally connected by a second pivot to the second pivot seat at the second end of the corresponding first cantilever portion. Each second cantilever portion has an opposite second end fixedly provided with the first pivot seat. A user may rotate the first and second cantilever portions about rotation axes defined by the rods, the second pivots, or the post, so as to adjust the relative positions of the corresponding fixing seat and second pivot seat, of the corresponding second pivot seat and first pivot seat, or of the two second pivot seats respectively. By doing so, the post, together with the device or object carried by the post, can be adjusted to an appropriate position closer to or farther away from the seat.

BRIEF DESCRIPTION OF THE SEVERAL VIEWS OF THE DRAWINGS

The structure as well as a preferred mode of use, further objects, and advantages of the present invention will be best understood by referring to the following detailed description of some preferred embodiments in conjunction with the accompanying drawings, in which.

DETAILED DESCRIPTION OF THE INVENTION

Figure 1:
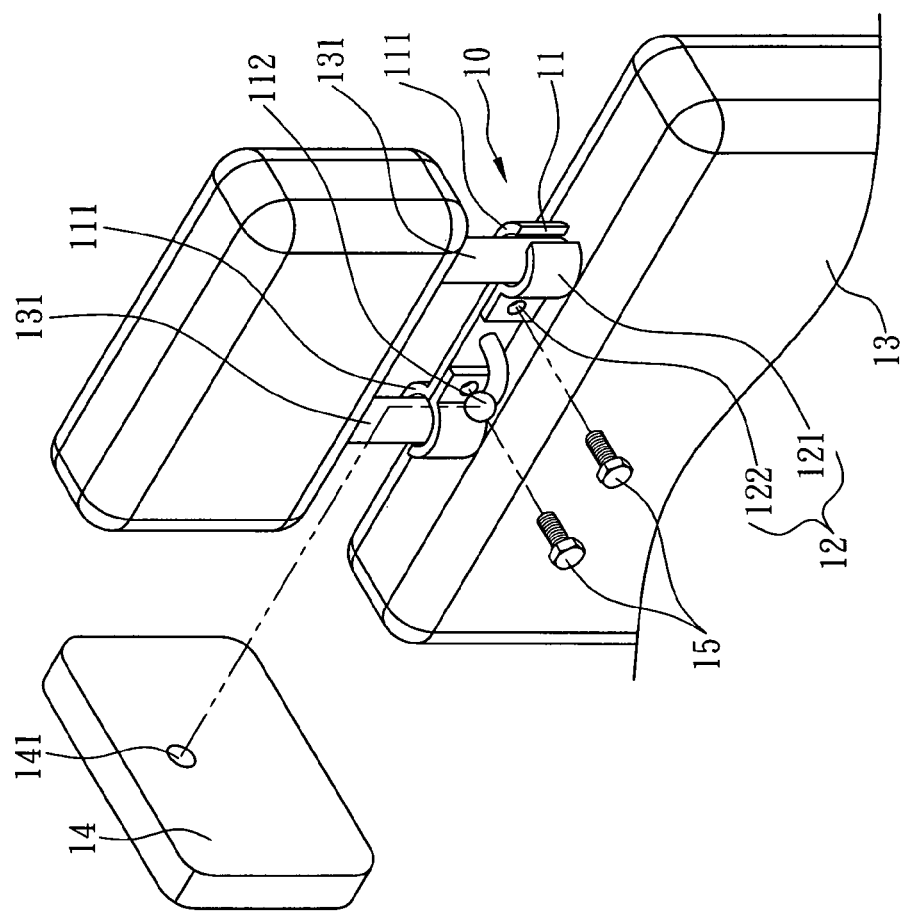
FIG. 1 is a perspective view of a conventional bracket to be mounted on a seat.
Figure 2:
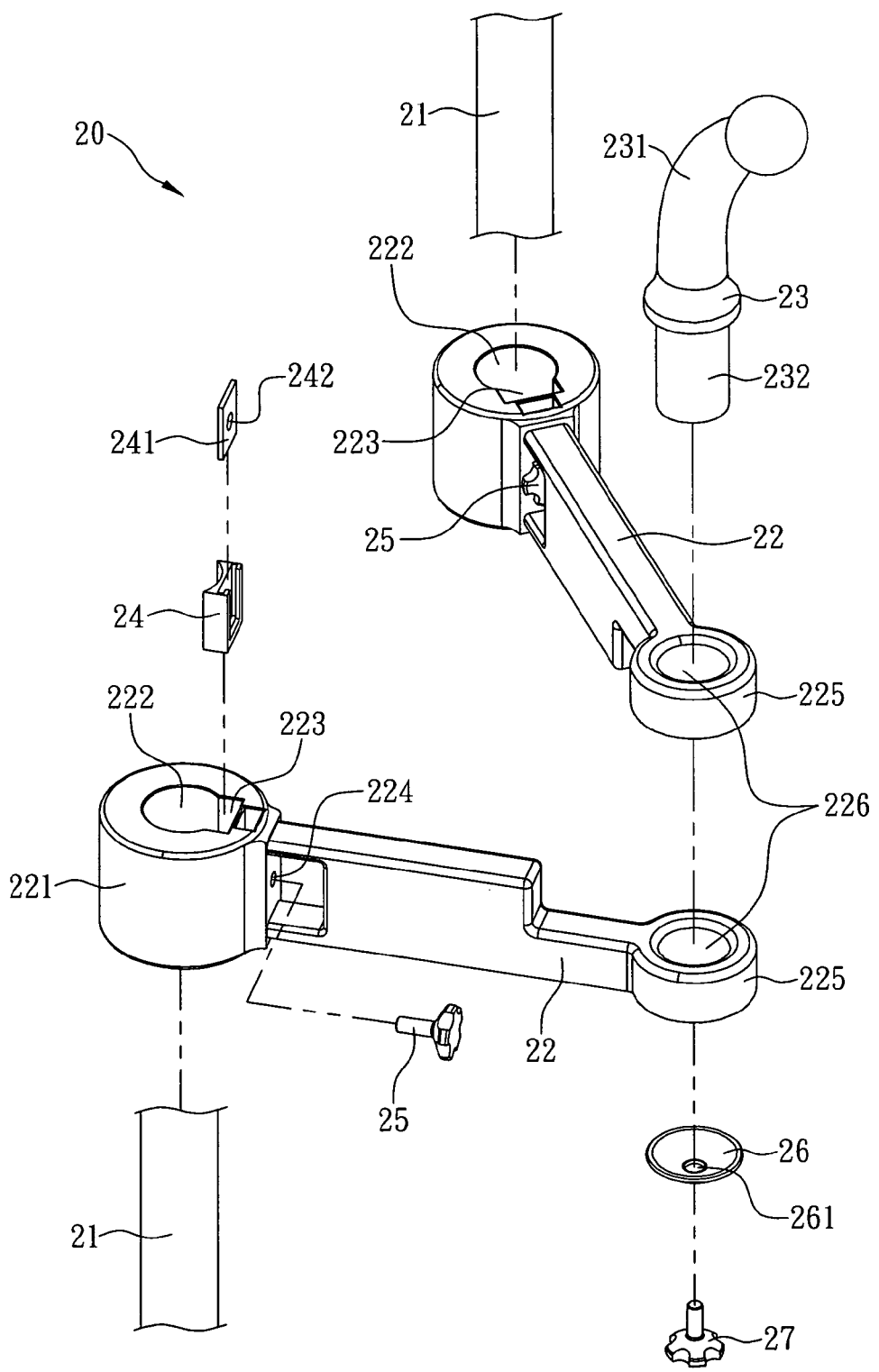
FIG. 2 is an exploded perspective view of a first preferred embodiment of the present invention.

The present invention provides a cantilever bracket to be mounted on a seat. Referring to FIG. 2 for the first preferred embodiment of the present invention, a cantilever bracket 20 is configured to be secured to two headrest supporting rods 21 of a seat and includes two cantilevers 22 and a post 23. A fixing seat 221 is provided at one end of each cantilever 22 and is formed with a through channel 222 through which the corresponding rod 21 can pass. Each fixing seat 221 has an inner wall surface concavely provided with a receiving cavity 223. The receiving cavities 223 correspond in position to the through channels 222 respectively and are each configured to receive a buffer block 24. Each fixing seat 221 further has an outer wall surface provided with a through hole 224. The through holes 224 correspond in position to and are in communication with the receiving cavities 223 respectively. Each of two first screws 25 has one end passing through the corresponding through hole 224, threadedly fastened to the buffer block 24 in the corresponding receiving cavity 223, and pressed tightly against the corresponding rod 21 either directly or indirectly, thereby securing the cantilevers 22 to the rods 21 respectively. The other end of each cantilever 22 is provided with a first pivot seat 225. Each first pivot seat 225 is penetrated by a pivot hole 226 through which the post 23 can pass. One end of the post 23 is curved to form a supporting portion 231 for supporting or hanging an object. The other end of the post 23 is provided with a first pivot 232. The first pivot 232 passes through the pivot holes 226 of the two first pivot seats 225 to connect the two cantilevers 22 pivotally together.

As shown in FIG. 2, the cantilever bracket 20 further includes an elastic pad 26. The periphery of the elastic pad 26 is pressed against the bottom of the first pivot seat 225 of one of the cantilevers 22 at a position adjacent to the pivot hole 226 of the corresponding first pivot seat 225. Also, the elastic pad 26 is centrally provided with an aperture 261. One end of a second screw 27 passes through the aperture 261 and is fastened threadedly to the first pivot 232, thereby pressing the periphery of the elastic pad 26 tightly against the bottom of the corresponding first pivot seat 225. Consequently, the elastic pad 26, the two cantilevers 22, and the post 23 are pivotally end tightly connected as a single unit.

In the present embodiment, a positioning plate 241 is received in one side of each buffer block 24, and each positioning plate 241 has a positioning hole 242. The aforesaid end of each first screw 25 passes through the corresponding through hole 224 and receiving cavity 223, is threadedly fastened in the positioning hole 242 of the positioning plate 241 in the corresponding buffer block 24, and is pressed tightly against the corresponding rod 21 by means of the corresponding buffer block 24. As a result, each cantilever 22 is fixed in position to the corresponding rod 21.

As the cantilever bracket 20 of the present invention is composed mainly of the two pivotally connected cantilevers 22, a user can adjust the distance between the fixing seats 221 of the two cantilevers 22 by rotating the two cantilevers 22 about a rotation axis defined by the post 23, so that the fixing seat 221 of each cantilever 22 is precisely aligned with and mounted around the corresponding rod 21. Hence, the cantilever bracket 20 of the present invention is suitable for being mounted on seats with various headrest supporting rod spacings and can spare manufacturers the trouble of having to produce brackets of different dimensions in accordance with the various headrest supporting rod spacings of seats, as is otherwise required in the case of the conventional bracket, whose distance between the two fixing seats cannot be adjusted. As such, the cantilever bracket 20 of the present invention features increased convenience of use and helps cut the storage and transportation costs which may otherwise result from producing brackets of different dimensions.

Figure 3:
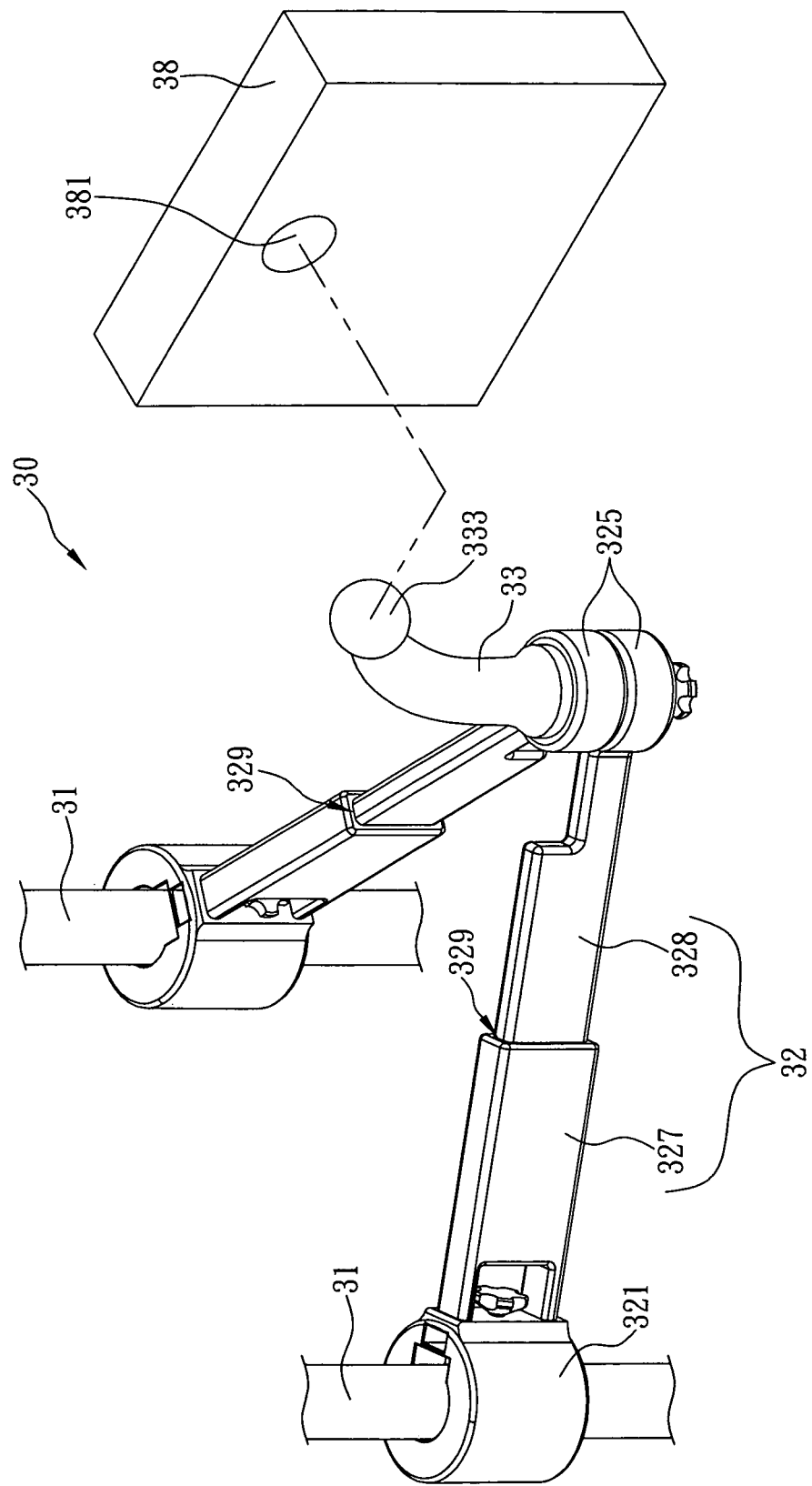
FIG. 3 is a perspective view of a second preferred embodiment of the present invention.

FIG. 3 illustrates the second preferred embodiment of the present invention, wherein each cantilever 32 of the cantilever bracket 30 consists of a first cantilever portion 327 and a second cantilever portion 328. Each first cantilever portion 327 has one end provided with a fixing seat 321 through which the corresponding one of two rods 31 of a seat can pass. Each first cantilever portion 327 has an opposite end provided with a receiving space (not shown) and an opening 329 in communication with the receiving space. Each second cantilever portion 328 has one end received and movable back and forth in the receiving space of the corresponding first cantilever portion 327. Each second cantilever portion 328 has an opposite end which extends out of the receiving space of the corresponding first cantilever portion 327 through the corresponding opening 329 and forms a first pivot seat 325. A post 33 passes through the two first pivot seats 325 and thereby connects the first pivot seats 325 pivotally together.

In the second preferred embodiment described above, the post 33 has one end formed with a bulged portion 333. The bulged portion 333 corresponds in shape to and is receivable in a hole 381 provided on the back of an audio/video playing device 38. After the cantilever bracket 30 is secured to the two rods 31, the bulged portion 333 at one end of the post 33 can be positioned in the hole 381 on the back of the audio/video playing device 38 to fix the audio/video playing device 38 in position to the cantilever bracket 30 on the back of the seat, thus allowing a user sitting on the seat to watch films or listen to music via the audio/video playing device 38. Once the forward/backward position or the tilt angle of the seat is adjusted such that the audio/video playing device 38 attached to the two rods 31 of the seat is moved or tilted away form its original position, the user can adjust the length of each second cantilever portion 328 that is received in the corresponding first cantilever portion 327, with a view to changing the length of each cantilever 32 and bringing the post 33, together with the audio/video playing device 38 connected thereto, to a proper position closer to or farther away from the seat. By doing so, the tilt angle or left/right viewing angle of the audio/video playing device 38 can be adjusted to the user's acceptable range in terms of viewing the images displayed by the audio/video playing device 38.

Figure 4:
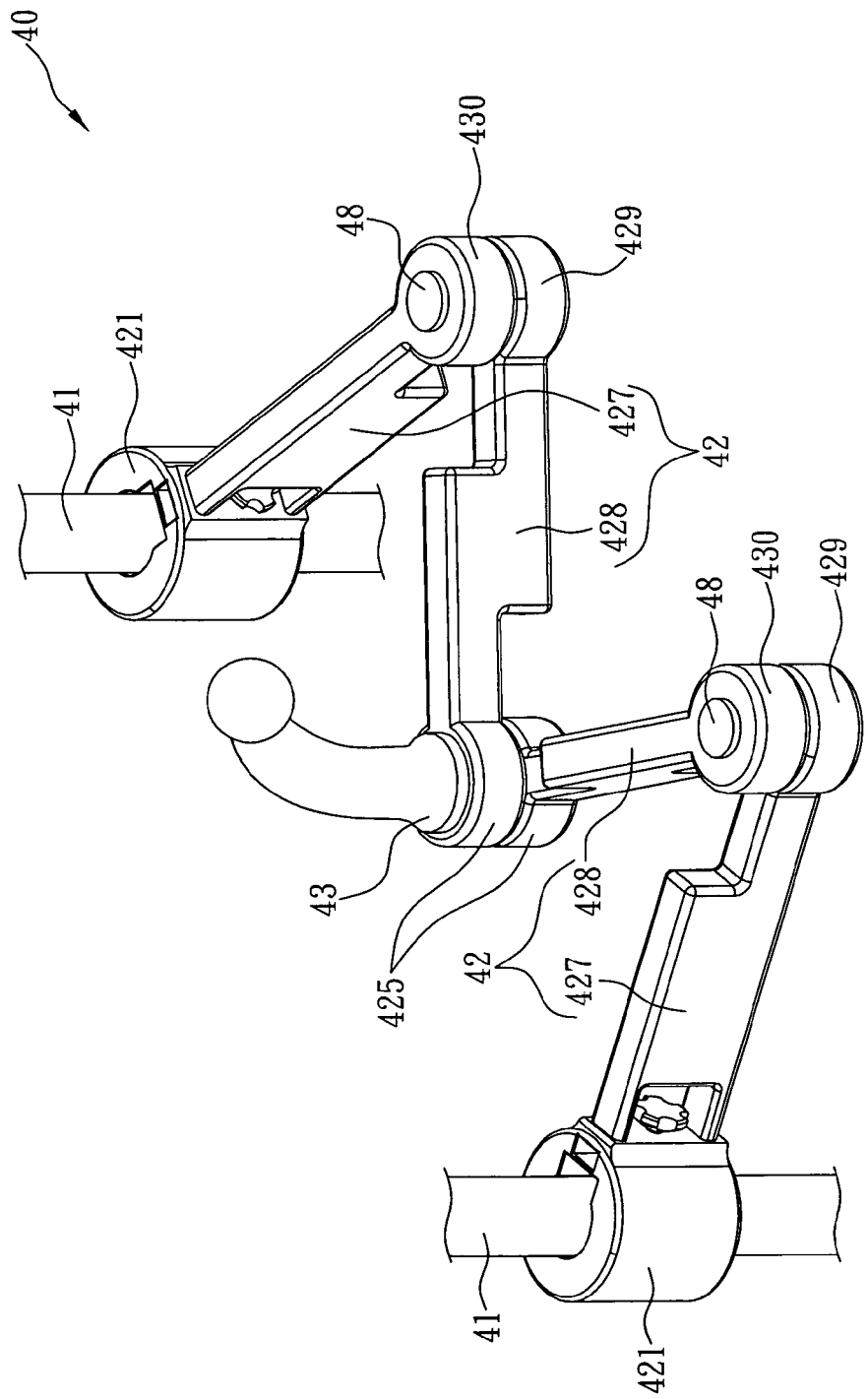
FIG. 4 is a perspective view of a third preferred embodiment of the present invention.

The third preferred embodiment of the present invention is shown in FIG. 4, wherein each cantilever 42 of the cantilever bracket 40 consists of a first cantilever portion 427 and a second cantilever portion 428. Each first cantilever portion 427 has a first end provided with a fixing seat 421 through which the corresponding one of two rods 41 of a seat can pass. Each first cantilever portion 427 has an opposite second end provided with a second pivot seat 429. Each second cantilever portion 428 has a first end provided with a third pivot seat 430, wherein the third pivot seat 430 is pivotally connected by a second pivot 48 to the second pivot seat 429 at the second end of the corresponding first cantilever portion 427. Each second cantilever portion 428 has an opposite second end fixedly provided with a first pivot seat 425. A post 43 passes through the two first pivot seats 425 to connect the first pivot seats 425 pivotally together. Hence, the relative positions of the corresponding fixing seat 421 and second pivot seat 429, of the corresponding second pivot seat 429 and first pivot seat 425, and of the two second pivot seats 429 can be adjusted by rotation about rotation axes defined by the rods 41, the second pivots 48, and the post 43 respectively. By moving the post 43 to a proper position closer to or farther away from the seat, the device or object carried by the post 43 can be adjusted along with the post 43 to a suitable position.

What is claimed is:

1. A cantilever bracket to be mounted on two headrest supporting rods of a seat, comprising:

two cantilevers, each said cantilever having an end provided with a fixing seat, each said fixing seat being provided with a through channel through which corresponding said rod passes, each said cantilever having an opposite end provided with a first pivot seat, each said first pivot seat being penetrated by a pivot hole, wherein each said fixing seat has an inner wall surface concavely provided with a receiving cavity for receiving a buffer block, the receiving cavities corresponding in position to the through channels respectively, each said fixing seat further having an outer wall surface provided with a through hole, the through holes being in communication with the receiving cavities respectively, thus allowing an end of a first threaded fastener to pass through a corresponding said through hole, be threadedly fastened to the buffer block in a corresponding said receiving cavity, and be pressed tightly against a corresponding said rod either directly or indirectly;

a post having an end curved into a supporting portion for supporting or hanging an object, the post having an opposite end provided with a first pivot, first pivot passing through the pivot holes of the two first pivot seats such that the two cantilevers are pivotally connected as a single unit; and an elastic pad having a periphery pressed against a bottom of the first seat of one said cantilever at a position adjacent to the pivot hole of the corresponding first pivot seat, the elastic pad being centrally provided with an aperture through which an end of a second threaded fastener passes so as to be threadedly fastened to the first pivot, thus pressing the periphery of the elastic pad tightly against the bottom of the corresponding first pivot seat.

* * * * *